United States Patent

Chapman et al.

[15] 3,680,491

[45] Aug. 1, 1972

[54] FREIGHT BRACING SYSTEM

[72] Inventors: Harvey W. Chapman, Detroit; Jackson A. Shook, Northville, both of Mich.

[73] Assignee: Evans Products Campany

[22] Filed: Dec. 13, 1967

[21] Appl. No.: 690,237

[52] U.S. Cl. ..............................105/369 B, 105/376
[51] Int. Cl. ..........................B61d 45/00, B60p 7/14
[58] Field of Search .........105/369 B, 376, 366, 371; 296/24, 28; 620/621

[56] References Cited

UNITED STATES PATENTS

| | | | |
|---|---|---|---|
| 2,543,143 | 2/1951 | Wells et al. | 296/28 R |
| 2,812,974 | 11/1957 | McHugh | 105/366 R |
| 2,896,554 | 7/1959 | Johnston | 105/369 B |
| 2,898,872 | 8/1959 | Hastings, Jr. | 105/366 R |
| 3,066,620 | 12/1962 | Schroeder | 105/369 B |
| 3,082,707 | 3/1963 | Prendergast | 105/369 B |
| 3,114,338 | 12/1963 | Schroeder et al. | 105/369 B |
| 3,144,336 | 12/1963 | Schroeder et al. | 105/369 B |
| 3,116,701 | 1/1964 | Stough | 105/369 B |
| 3,352,595 | 11/1967 | Bezlaj | 296/24 R |
| 2,616,375 | 11/1952 | Nampa | 105/369 B |
| 3,013,684 | 12/1961 | King et al. | 214/620 |
| 3,431,015 | 3/1969 | Breen et al. | 296/24 |
| 3,477,392 | 11/1969 | Loomis et al. | 105/376 |
| 3,486,468 | 12/1969 | Bezlaj et al. | 105/376 |

*Primary Examiner*—Drayton E. Hoffman
*Attorney*—Harness, Dickey & Pierce

[57] ABSTRACT

Two embodiments of freight bracing systems for supporting or bracing freight within a cargo area. Each system embodies belt rails that extend along opposite walls of a cargo area and which belt rails define spaced attachment means along their length. A number of bracing units are supported upon the belt rails with their freight engaging faces extending either horizontally whereby the units function as pallets or with their freight engaging faces extending vertically whereby the units function as bulkheads. Each unit is capable of acting as a pallet or a bulkhead. In one embodiment, the end fittings which support the bracing unit upon the belt rails include releasable locking means with an actuating mechanism that is adapted to be engaged by the forks of the fork lift truck regardless of the position of the unit for release of the latching means automatically upon the engagement of the forks with the release mechanism.

1 Claim, 15 Drawing Figures

3,680,491

FREIGHT BRACING SYSTEM

BACKGROUND OF THE INVENTION

This invention relates to a cargo bracing system embodying an improved combined pallet and bulkhead assembly, an improved belt rail construction and an improved end fitting latch mechanism.

As is well known, cargo shipped in such cargo carrying vehicles as highway trucks and railway cars is subjected to considerable shock loadings. Many types of damage prevention devices have been proposed for precluding movement of the cargo and associated damage under these shock loading conditions. Typical examples of such damage preventing devices well known to those skilled in the art are: crossbars, slide fillers, bulkheads, deckboards, and the like. The aforenoted type of damage prevention or freight bracing devices are either separate units which are readily detached from the cargo area, such as crossbars, or may be units which are relatively permanently installed in the cargo area, such as bulkhead assemblies. It is not uncommon for a given cargo carrying vehicle to be equipped with or adapted to be equipped with more than one type of such devices since the type of bracing required frequently depends upon the load carried. Although the use of different types of bracing devices in one vehicle adds to the versatility of the vehicle, it also adds considerably to its cost. In addition, all of the bracing equipment is often not required at a given time.

It is, therefore, a principal object of this invention to provide a freight bracing system that offers increased versatility.

It is another object of this invention to provide an improved freight bracing system embodying a bracing member that may be used in a variety of manners without substantial modification.

It is another object of this invention to provide a freight bracing unit that may be used as either a horizontally disposed load supporting pallet or as a vertically orientated freight bracing bulkhead.

Various types of freight bracing devices are supported on opposing side walls of the cargo area through cooperation with wall mounted attachment means known as belt rails. The interengagement between the bracing device and the belt rail should offer a substantially rigid connection but should provide for convenient assembly and removal. In order to obtain the positive connection, different forms of releasable latching mechanisms have been proposed for use with certain types of these bracing devices. The use of such latching mechanism, however, has heretofore necessitated an independent releasing operation.

It is, therefore, another object of this invention to provide a latching mechanism for a freight bracing device that will be operated automatically when the device is inserted or removed from a cargo area.

The supporting belt rails bear substantially the full brunt of the shock loads transferred from the bracing devices to the supporting side walls of the transporting vehicle. It is, therefore, necessary for these belt rails to be substantially rigid. There is a practical limit, however, to the weight of the individual belt rails since their weight subtracts from the useful weight which may be carried by the vehicle. In addition, the belt rail should be of such a nature that it may be conveniently and inexpensively manufactured.

It is, therefore, another object of this invention to provide an improved belt rail for a freight bracing device.

It is another object of this invention to provide a belt rail that is simple in operation, low in weight and extremely strong.

BRIEF SUMMARY OF THE INVENTION

A freight bracing system embodying this invention is particularly adapted for use in a railway car or the like having facing walls defining at least in part a cargo lading area. At least two elongated attachment rails are affixed to each of the walls in spaced parallel relationship to each other. Each of the attachment rails provides spaced attachment means along its length. The spacing of certain of the attaching means of one of the rails from the respective attachment means of the other of the rails on the same wall is equal to the spacing of certain of the attaching means on the one rail. A bracing unit is supported between the walls on at least one of the attachment rails of each of the walls. The bracing unit comprises means defining a freight engaging face and adapted to support articles thereupon in the lading area when positioned horizontally for operation of the unit as a pallet. The freight engaging face is also adapted to engage articles and prevent horizontal shifting thereof within the lading area when the unit is positioned vertically for operation as a bulkhead. The bracing unit further comprises spaced end fitting means at each side thereof for supporting the unit upon the rails through cooperation with the attachment means. The end fitting means at each side of the unit are spaced from each other a distance the same as the spacing of the certain units on the one attachment rail for support of the unit in either a vertical or a horizontal orientation.

A combined pallet and bulkhead assembly embodying this invention is particularly adapted for use in a combination of the type described in the immediately preceding paragraph. The pallet and bulkhead assembly is comprised of frame means that define a load engaging face that is adapted to be positioned either horizontally or vertically. First and second spaced end fitting means are positioned at one side of the frame means for supporting the one side of the assembly on cooperating attachment means of a belt rail or the like. Third and fourth spaced end fitting means are positioned at the other side of the frame means for supporting the other side of the assembly upon cooperating attachment means of a belt rail or the like. The portion of each of the end fittings that is adapted to cooperate with the belt rail attachment means is symmetric about a central axis for attachment of the end fittings means to the cooperating belt rail attachment means with the load engaging face extending either horizontally or vertically and without necessitating reorientation of the end fitting means relative to the frame means.

As a still further feature of the invention, a combined pallet and bulkhead of the type described in the immediately preceding paragraph, may further include a latch means embodying this invention. The latch means comprises a locking means cooperating with the attachment means of the belt rail for releasably locking the end fitting means relative to the belt rail. In addition, a release mechanism is operatively connected to the locking means for moving the locking means between its engaged and disengaged positions. This release means includes an element that is adapted to be engaged by a fork lift truck or the like when the unit is positioned in either its horizontal or vertical orientation and when the fork cooperates with the unit for inserting or removing the unit from the supporting relationship with the belt rail.

An integral belt rail embodying this invention is particularly adapted for use in supporting a freight bracing device of the type described in the two immediately preceding paragraphs or for use in a freight bracing system as described in the first paragraph of this section of the specification. The belt rail embodying this invention is comprised of a pair of elongated, integrally connected, diverging legs adapted to be connected at their outer ends to a fixed member within the cargo area. A third, elongated, upstanding leg is integrally connected to the pair of legs contiguous to their bight. The third leg defines spaced attachment means along its length for cooperation with a freight bracing device end fitting for attaching the freight bracing device to the belt rail.

BRIEF DESCRIPTION OF THE DRAWINGS

FIG. 2 is a top plan view of one of the bracing units shown in FIG. 1, with the load engaging face removed to more clearly show the construction.

FIG. 3 is a side elevational view of the bracing unit shown in FIG. 2.

FIG. 13 is an enlarged cross-sectional view taken along the line 13—13 of FIG. 9.

DETAILED DESCRIPTION OF THE PREFERRED EMBODIMENTS OF THE INVENTION

Embodiment of Figures 1 through 7

Figure 1:
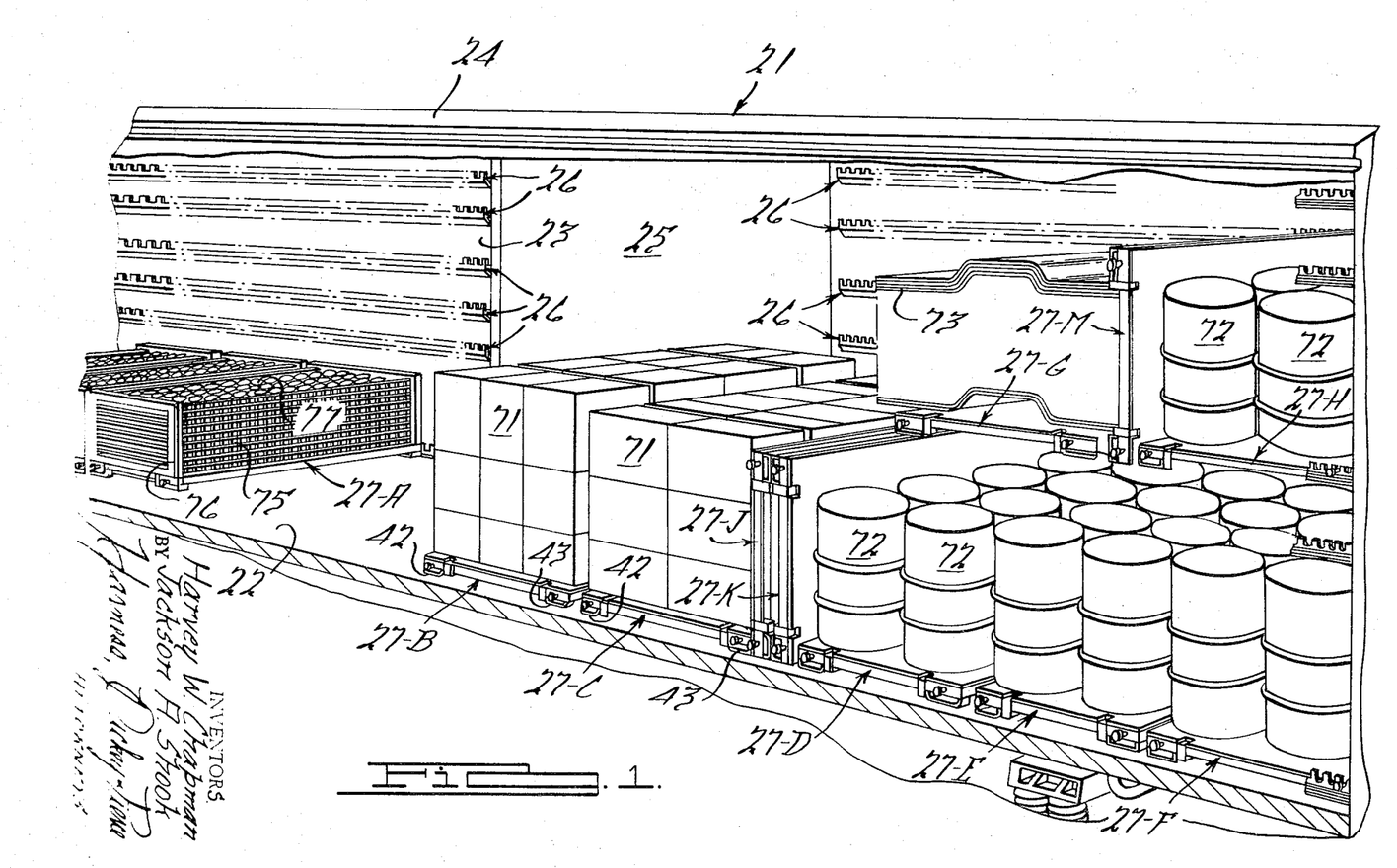
FIG. 1 is a perspective view, with portions broken away, of a section of a railway car incorporating a freight bracing system constructed in accordance with a first embodiment of this invention.

A railway freight car incorporating a freight bracing system utilizing a first embodiment of this invention is identified generally by the reference numeral 21. It is to be understood that, although the invention is described in conjunction with use in a railway car, the freight bracing system as well as its various components may be employed in other cargo areas. The invention, however, has particular advantage in the bracing of freight within a freight transporting vehicle such as a railway car or highway truck where the cargo will experience shock loading. The railway car 21 is of the boxcar type and has a floor 22, side wall 23, opposing side wall (not shown), roof 24 and end walls (not shown) that define a closed cargo area. A doorway opening 25 is formed in the side wall 23 and a like doorway opening may be formed in the opposing side wall to facilitate loading and unloading of the car 21.

A plurality of parallel, horizontally disposed, elongated belt rails 26 are affixed to the side wall 23. The belt rails 26 extend substantially the full length of the side wall on either side of the doorway opening 25. Like belt rails are fixed to the opposite side wall at substantially the same distances from the floor 22 as those supported upon the side wall 23. As will become more apparent as this description proceeds, the belt rails 26 provide means whereby bracing units, indicated generally by the reference numeral 27, may be detachably supported relative to the opposite side walls and extend across the width of the car 21. As will also become apparent, the bracing units 27 may extend in a horizontal direction and thus serve as pallets, as indicated by the reference numerals 27A, 27B, 27C, 27D, 27E, 27F, 27G and 27H, or the units 27 may be vertically disposed and thus function as bulkheads, as indicated by the reference numerals 27J, 27K and 27M. The upper face of each of the units 27 is also formed so as to permit the attachment of sides so that the unit 27 may function as a tote box as typified by the pallet unit 27A.

Referring now in detail to FIGS. 2 through 7, each of the units 27 is comprised of a frame assembly, indicated generally by the reference numeral 28, which is generally of open construction across the upper face of which a sheet of plywood or the like 29 is fixed to provide a load engaging face. In certain of the views, the plywood panel 29 has been removed to more clearly show the details of the construction of the frame assembly 28. The frame assembly 28 is made up of pairs of facing channels 31 and 32 and 33 and 34 at each side that extend the full length of the unit 27. The channels 31, 32, 33 and 34 are fixed to each other by means of transversely extending frame members 35, 36, 37, 38, 39 and 41, which may be of any suitable configuration and which are affixed, as by welding to the respective channel members 31 through 34. At each corner of the frame 28, a pair of channel shaped members 42 and 43 are fixed to the respective cross members 35 and 41 and extend downwardly therefrom. The respective pairs of members 42 and 43 form feet or legs upon which the unit 27 may be supported prior to loading within the cargo area.

End fittings, indicated generally by the reference numerals 44, 45, 46 and 47 are affixed to each of the four corners of the frame assembly 28 to facilitate attachment of the units 27 to the respective supporting belt rails 26, as will become more apparent as this description proceeds. Each of the end fittings 45 comprises a generally cylindrical shank portion 48 that extends through a complementary aperture formed in a plate 51 that extends between and is fixed to the channel shaped frame members 31 and 32 or 33 and 34. The shank portion 48 terminates at one end in a reduced diameter portion 53 that extends through a complementary aperture in a plate 52 which is also fixed to the frame assembly 28. A fastener 54 extends through the end fitting portion 53 to detachably connect each of the end fittings 44–47 to the frame assembly 28 to facilitate replacement or servicing. The shank portion 48 extends laterally outwardly of the plate 51 and terminates in an enlarged headed portion 55 that is also cylindrical in configuration. Because of the cylindrical shape of the respective portions of the end fittings 44 through 47, these end fittings are symmetric about a central axis which is important in permitting the end fittings 44 through 47 to be attached to the belt rails 26 with the unit 27 extending either in a horizontal or a vertical direction.

Figures 4, 5, 6:
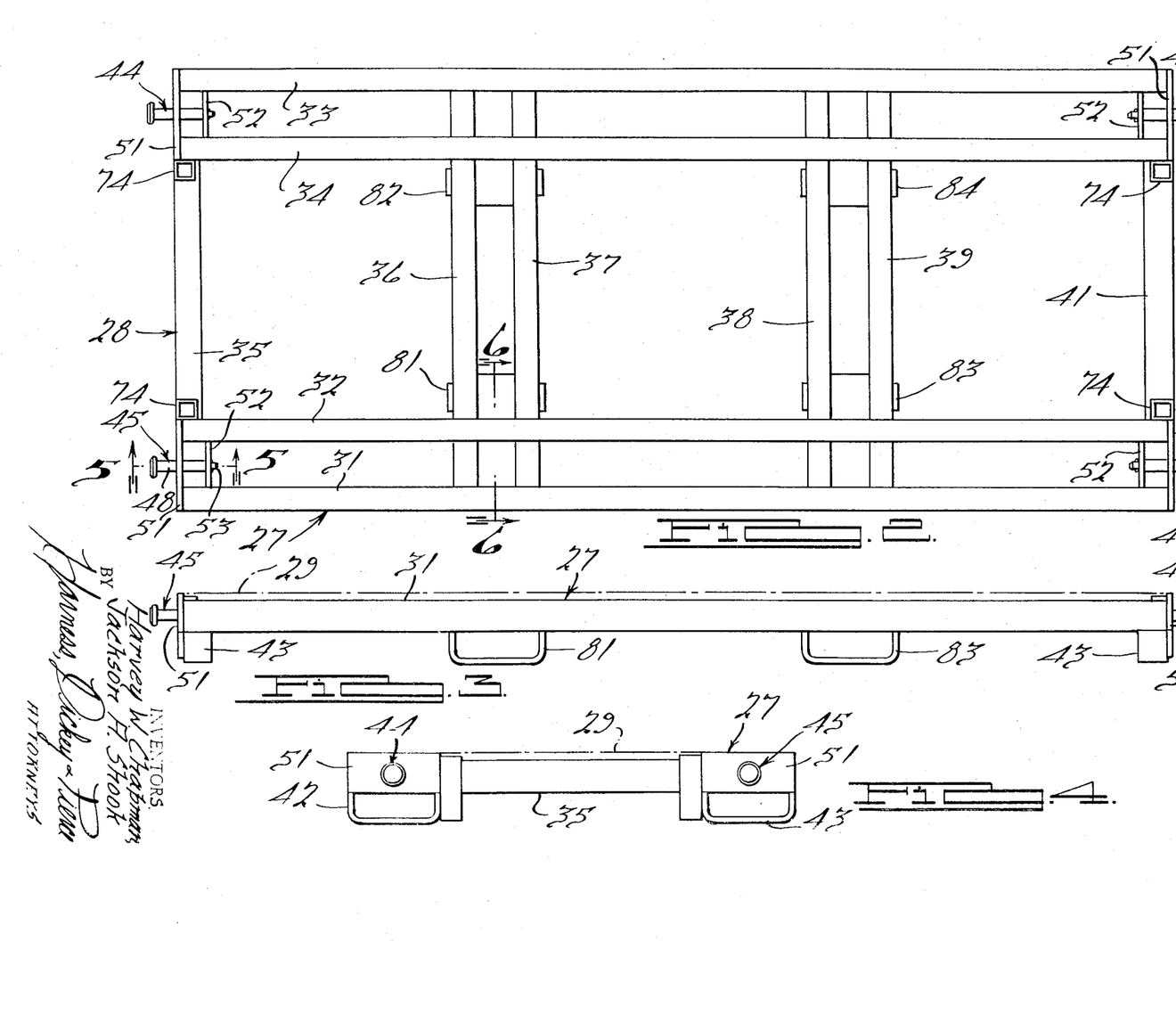
FIG. 4 is an end elevational view of the bracing unit in FIG. 2.
FIG. 5 is an enlarged cross-sectional view, taken generally along the line 5—5 in FIG. 2, and shows the bracing unit in supporting engagement with the belt rail.
FIG. 6 is an enlarged cross-sectional view taken along the line 6—6 of FIG. 2 showing the relationship of the bracing unit with a fork lift truck when the unit is positioned in a horizontal orientation.
Figure 5:
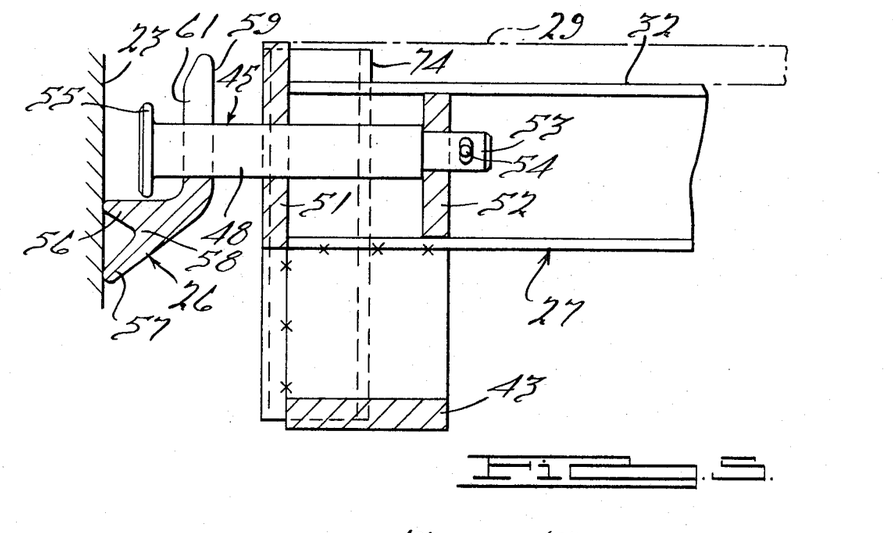

Referring now to FIGS. 1 and 5, each of the belt rails 26 is formed with a configuration whereby the respective belt rails be formed as extrusions or rolled forms. In addition, the configuration of the belt rails 26 provides for an extremely high strength so as to resist the considerable shock loadings encountered in this type of freight bracing without any sacrifice in weight. The construction also provides a relatively large area along which the respective belt rail 26 may be secured to the side wall 23 further enhancing the overall strength of the assembly. The belt rails 26 are comprised of a pair of integrally connected, angularly disposed legs 56 and 57 (FIG. 5) connected together at a bight 58. The leg 56 extends in a substantially horizontal direction when attached to the wall 23 and the leg 57 extends downwardly and at an angle to the wall 23. Adjacent the bight 58 an upstanding leg 59 is integrally connected to the legs 56 and 57. The leg 59 extends at a right angle to the leg 56 and at an obtuse angle to the leg 57.

The outer ends of the belt rail legs 56 and 57 engage the wall 23 and provide a surface along the length of the side wall 23 whereby the legs 56 and 57 may be welded or otherwise secured to the wall 23. Thus, a substantially large area is provided for this attachment. Alternatively, the belt rails 26 may be secured to structural members of the side wall 23 at spaced locations or may extend across the doorway opening 25 with suitable other attachment means to act as doorway members, as is well known in this art.

Slots or attachment openings 61 are formed at spaced intervals along the length of the leg 59. The openings 61 extend through a major portion of the leg 59 and through its upper edge. The openings 61 are adapted to receive the respective end fittings 44 through 47 with the end fitting portion 55 extending between the leg 59 and side wall 23 to detachably connect the units 27 to their respective belt rails 26, as clearly shown in FIG. 5. For this reason, the center-to-center distance between pairs of the slots 61 are spaced at intervals the same as the center-to-center distance between the end fittings 44 and 45 and 46 and 47. In order to permit a finer adjustment, adjacent of the slots 61 are spaced at a distance less than the center-to-center distance between the end fittings but at a distance which is equally divisible into the center-to-center distance between the end fittings 44 and 45. In a like manner, pairs of the belt rails 26 on each of the side walls 23 are vertically spaced so that their respective slots 61 are spaced apart a distance equal to the distance between the end fittings 44 and 45 and 46 and 47. Thus, the units 27 may be supported at each side upon a single of the belt rails 26 to extend in a horizontal direction or may be supported upon pairs of the belt rails 26 on the wall 23 at one side in a vertical direction. Again, adjacent of the belt rails 26 on the wall 23 need not be spaced at the distance equal to the distance between the end fittings 44 and 45 but preferably should be spaced at a distance that is equally divisible into this distance to permit a finer adjustment.

In the horizontal position, the plywood load engaging face 29 of the unit 27 is adapted to support a wide variety of articles such as boxes 71, barrels 72 or relatively large parts such as automotive frame components 73. In addition, the bracing unit 27 is formed with socket openings 74 (FIG. 2) to detachably receive posts of side frame members 75 and 76 (FIG. 1) whereby the unit 27 may coact with these side frame members to form a tote box 27A to hold a plurality of smaller parts 77.

Figures 6, 7:
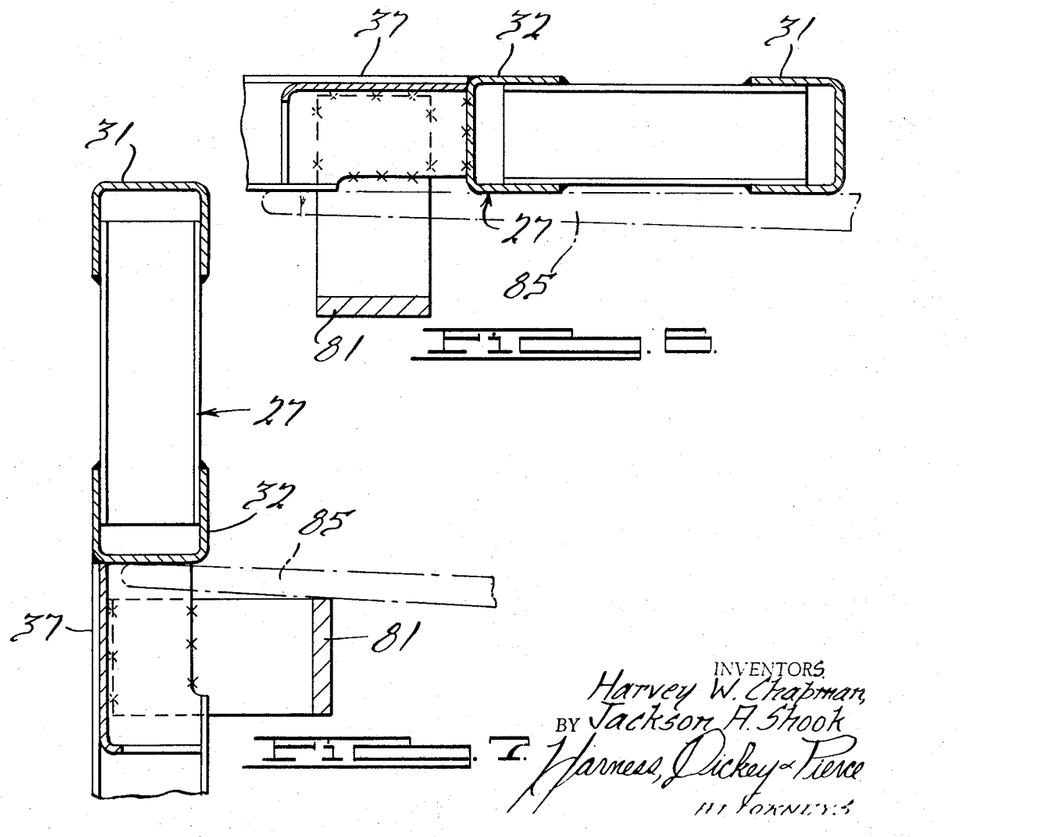
FIG. 7 is a cross-sectional view, in part similar to FIG. 5, showing the relationship of the bracing unit to a fork lift truck when the unit is positioned in vertical orientation.

The feet 42 and 43 form openings into which the forks of the fork lift truck may be inserted to carry the units 27 from either end. More often, however, the units 27 will be supported in their horizontal position with the forks of the fork lift truck extending across their width immediately adjacent the cross frame members 36 and 37 and 38 and 39. U-shaped depending members 81 and 82 are affixed to the cross members 36 and 37 at each edge of the unit 27. Like U-shaped members 83 and 84 are affixed to the cross frame members 38 and 39 at each edge of the unit. The members 81 through 84 are adapted to receive a fork 85 of a fork lift truck (FIG. 6) when the unit 27 is positioned in its horizontal orientation to insure that the unit 27 will not bounce off of the forks 85. In a like manner, the members 81 through 84 are juxtaposed to the frame members 32 and 34, respectively, so that the fork 85 will extend into a gap between these elements (FIG. 7) when the unit 27 is being moved while in a vertical orientation. The members 81 through 84 are spaced from the adjacent faces of the respective frame members 32 and 34 a distance that is slightly greater than the thickness of the forks 85 of the fork lift truck. Due to this spacing, the forks 85 may be inserted into the gap with the forks extending in a substantially horizontal direction and then the forks are rotated through a small acute angle to the horizontal so that they will become wedged between the members 81 through 84 and the respective of the frame members 32 and 34 as shown in FIG. 7. This wedging action insures that the unit 27 will not fall from the forks 85 when the unit 27 is being transported in its vertical orientation. The unit 27 may be tipped between its horizontal position and a vertical position by positioning the forks 85 under the frame members 31 and 32. During this operation, the end of the forks 85 should be positioned only slightly inwardly of the frame member 32. Lifting of the forks 85 will cause the unit 27 to pivot about its outer edge and move to the vertical position wherein the unit 27 is supported by the forks 85 at the frame member 32.

Embodiment of Figures 8 through 15

In the previously described embodiment, the units 27 were supported upon the belt rails 26 by end fittings 44 through 47, which engaged slots 61 formed in the respective belt rails. Enlarged head portions 55 of the end fittings prevented lateral disengagement from the belt rails and the upstanding portion of the legs adjacent the slots 61 prevented horizontal displacement. Although there are some vertical forces which might tend to cause disengagement of the end fittings 44 through 47 with the belt rails 26, the slots 61 in the previously described embodiment have sufficient depth to preclude actual disengagement. In addition, the weight of the unit 27 and the load carried thereon as well as the fact that the front and rear end fittings do not tend to lift simultaneously assist in precluding any vertical disengagement. In some instances, however, it may be desirable to provide a more positive latching between the respective end fittings and the belt rails. The embodiment shown in FIGS. 8 through 15 provides such a locking structure and further employs a locking structure that is automatically engaged and disengaged.

Referring now in detail to FIGS. 9 through 15, the invention in this embodiment is depicted, by way of illustration, in conjunction with a railway freight car 101 having opposing side walls 102 and 103 from which bracing units embodying this invention are adapted to be supported either in a vertically extending position, as shown at 104, or in a horizontally extending position, as shown at 105. The bracing units 104 and 105 are supported upon horizontally extending belt rails 106 that are affixed to the respective side walls 102 and 103 in any known manner.

As in the previously described embodiment, each of the units 104 and 105 is made up of a frame assembly, end fittings and load engaging faces. In this embodiment, each frame assembly comprises a pair of side frame members 107 and 108 each of which, in this embodiment, is a structural or fabricated I-beam that extends substantially the full length of the respective unit 104 or 105. Transversely extending frame members 111, 112 and 113 span the side frame members 107 and 108 at each end and affix these members together. At least one sheet metal face 114 is fixed to one side of the frame assembly to define the load-engaging face.

End fitting assemblies 115 are provided at opposite edges of each side of each of the units 104 and 105 to provide a detachable connection to the belt rails 106. Each of the end fittings 115 is comprised of a pair of box-shaped members 117 and 118 that are fixed to the unit frame assembly in back-to-back relationship and which define parallel, vertically extending openings 119 and 121 in which latching pin forgings 122 and 123, respectively, are supported for reciprocation. The outer end of the latching pin forging 122 is formed with a pair of integral, vertically spaced locking pins 124 and 125. In a like manner, the outer end of the latching pin forging 123 is provided with vertically spaced, integral locking pins 126 and 127. The distance from the center of the locking pin 124 to the centers of the locking pins 125 and 126 is equal and is the same as the distance between the center of the locking pin 127 to the locking pins 125 or 126, for a reason which will become more apparent as this description proceeds. A fixed end fitting member 128 is carried by the adjacent webs 131 and 132 of the box-shaped members 117 and 118 between the locking pins 124, 125 and 126 and 127. The inner end of the end fitting member 128 is bifurcated, as at 133, to straddle the webs 131 and 132 (FIGS. 9 and 14) and to be affixed thereto, as by welding. The outer end of the member 128 is generally rectangular in shape and ends in an enlarged head portion 135.

An actuating mechanism is provided at each side of the unit for reciprocating the adjacent latching pin forgings 122 and 123 between their engaged and disengaged positions. Each actuating mechanism comprises a contact lever 137 that is pivotally supported with respect to the frame upon a fixed pivot pin 138. The contact member 137 extends across a transversely extending opening 139 formed in the unit frame and defined by a generally tubular member 140 that is fixed to the webs of the side frame members 107, 108. Contact lever 137 also extends across an opening 141 formed in the freight engaging surface of the unit 104 or 105 at the respective end of the unit.

The inner end of the contact lever 137 is pivotally connected to a transversely extending link 142 having a U-shaped cross-section by means of a pivot pin 143. A tension spring 144 is connected between the pivot pin 143 and a bracket 145 fixed to the frame member 111 to return the contact lever 137 to a normal position, as shown in solid line view of FIG. 9, in which the latching pin forgings 122 and 123 are in their engaged positions. The respective opposite ends of the link 142 are connected to supporting levers 146 and 147 by pivot pins 148 and 149, respectively. The supporting levers 146 and 147 are supported for pivotal movement with respect to the frame by means of pivot pins 151 and 152, respectively. The pivot pins 148 and 149 also pivotally connect one end of actuating levers 153 and 154 to the link 142. The outer ends of the actuating levers 153 and 154 are pivotally connected to the respective latching pin forgings 122 and 123 of the end fitting assemblies 115 by means of pivot pins 155 and 156 that extend through bosses in respective ends of the end fitting forgings 122 and 123.

Figures 9, 11, 12:
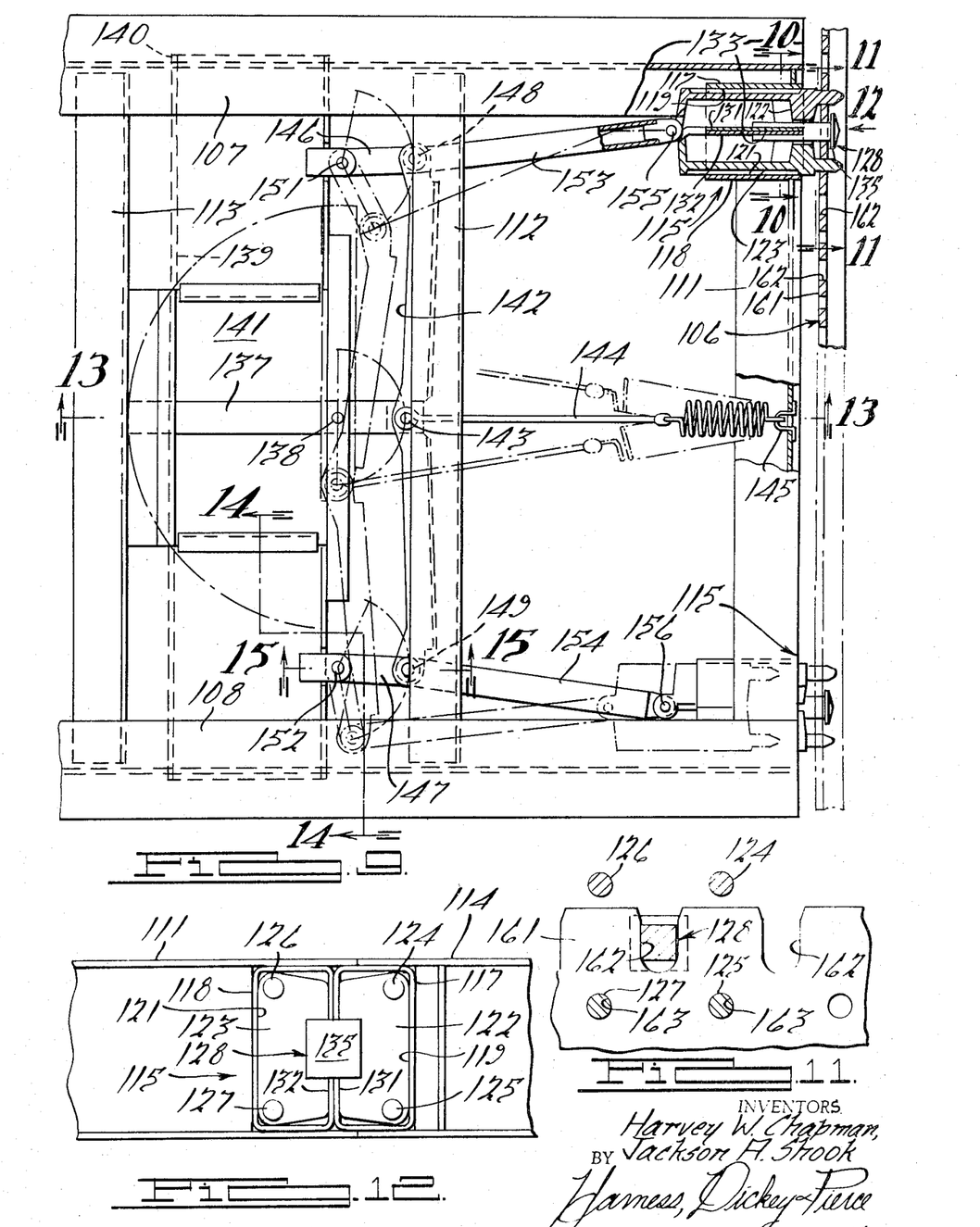
FIG. 9 is a partial top plan view of one of the bracing units of the embodiment of FIG. 8, with portions broken away.
FIG. 11 is an enlarged cross-sectional view taken along the line 11—11 of FIG. 9.
FIG. 12 is an enlarged end elevational view of the end fitting construction of the unit shown in FIG. 9 and taken generally in the direction of the arrow 12 in FIG. 9.
Figures 10, 14, 15:
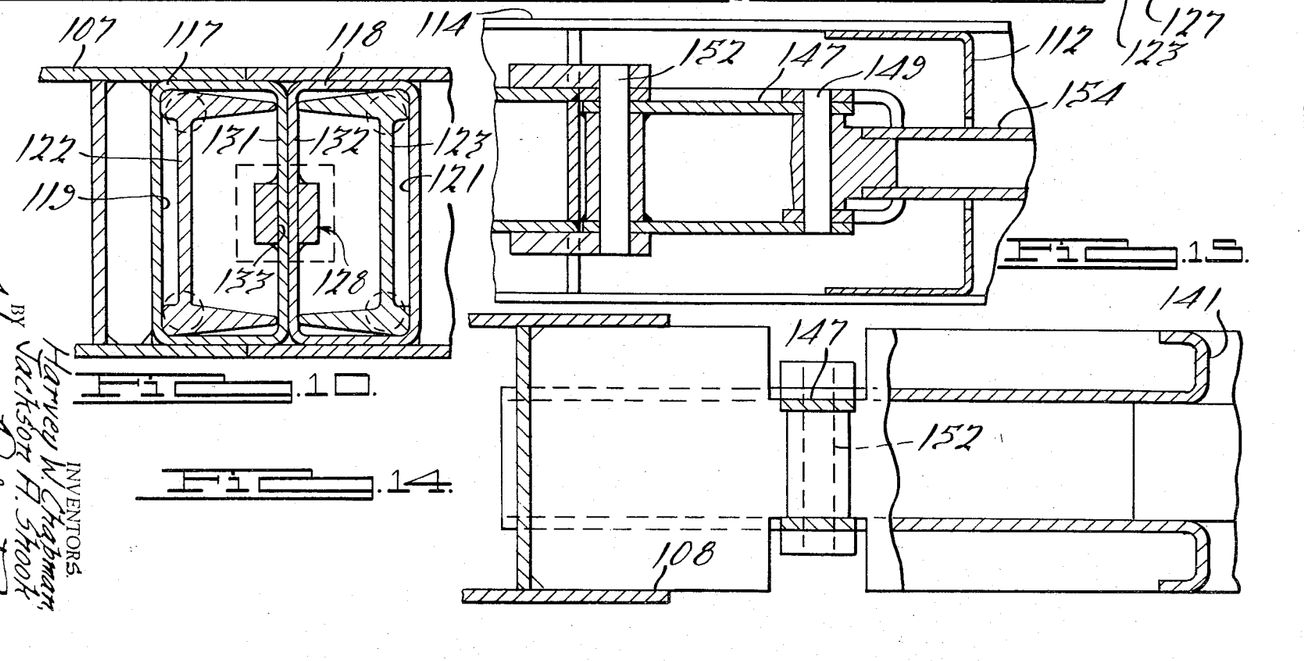
FIG. 10 is an enlarged cross-sectional view taken along the line 10—10 of FIG. 9.
FIG. 14 is an enlarged cross-sectional view taken along the line 14—14 of FIG. 9.
FIG. 15 is an enlarged cross-sectional view taken along the line 15—15 of FIG. 9.
Figure 12:
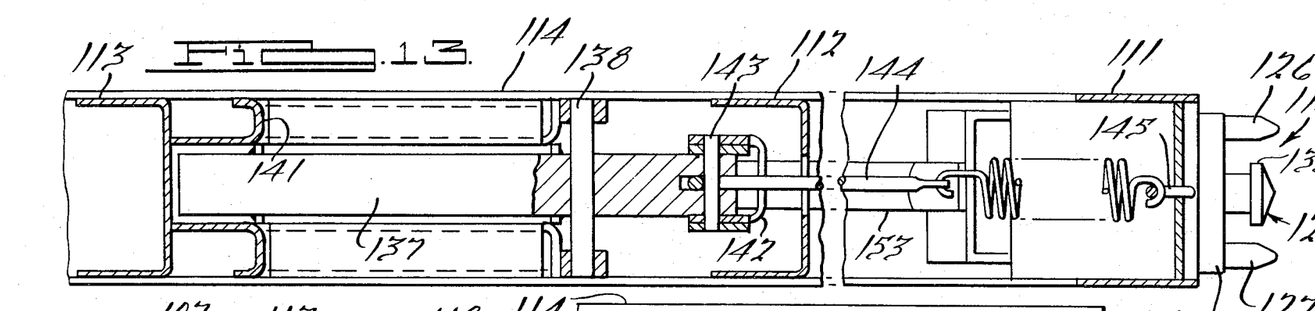

It should be readily apparent that pivotal movement of the contact lever 137 in either direction about the pivot pin 138 causes the link 142 to move in a parallel path defined by the supporting levers 146 and 147 to operate the actuating levers 153 and 154 and draw the respective latching pin forgings 122 and 123 of the end fitting assemblies 115 inwardly from their engaged position to the disengaged position as shown in the dotted line views of FIG. 9. Upon release of exertion of any force on the contact lever 137, the spring 144 will return the contact lever 137 and the respective latching pin forgings 122 and 123 to their engaged position.

Figure 8:
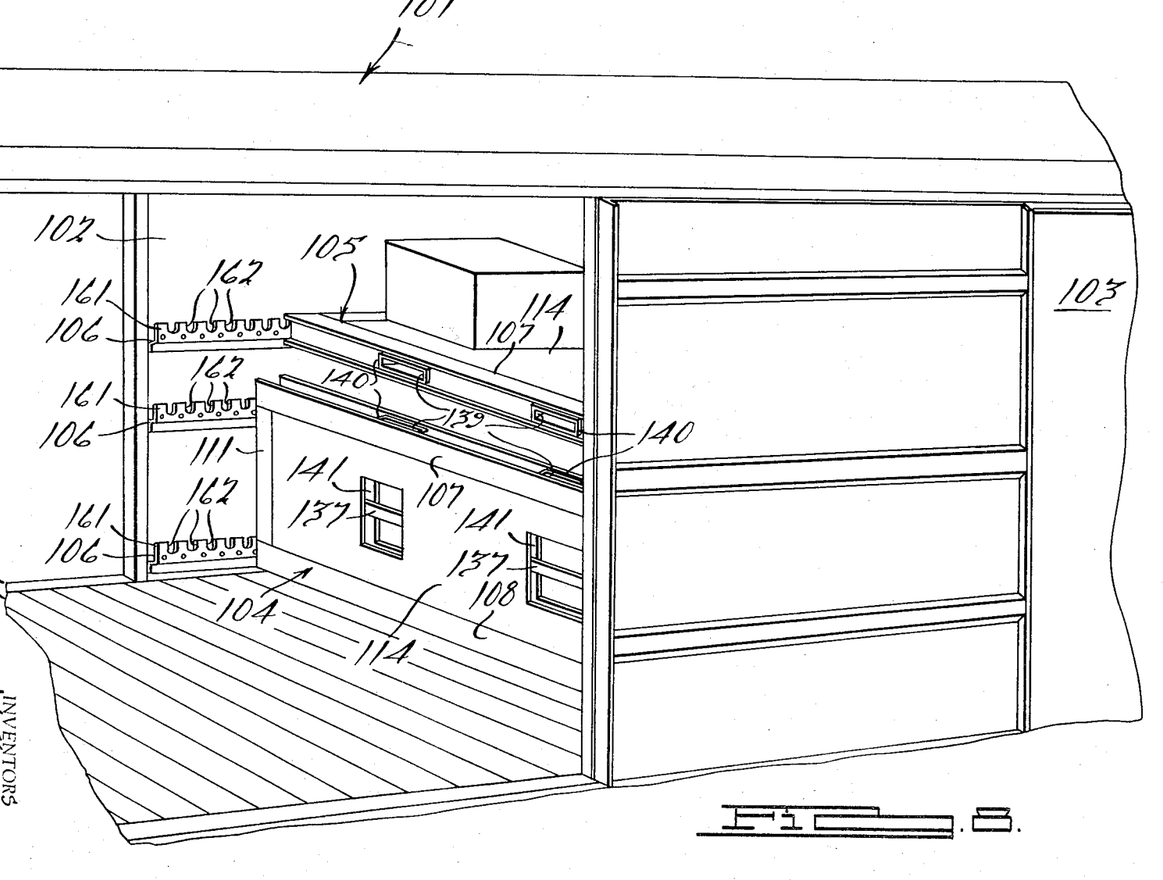
FIG. 8 is a perspective view of a section of a railway freight car, in part similar to FIG. 1, incorporating a bracing system constructed according to another embodiment of the invention.

Referring now specifically to FIGS. 8 and 11, each of the belt rails 106 has a generally Z-shape with an upwardly extending leg 161 in which longitudinally spaced notches 162 are formed. The notches 162 have a width substantially equal to the width of the shank portion of the fixed end fitting part 128 so as to receive this part. The center-to-center spacing between pairs of the notches 162, as in the previously described embodiment, is equal to the center-to-center spacing between the end fittings 115 at each side of the unit 104 or 105 so as to permit attachment of the end fittings 115 to one of the horizontally extending belt rails 106. In a like manner, the center-to-center spacing between the notches 162 of pairs of vertically disposed belt rails 106 is equal to the spacing so that the units 104, 105 may be supported in a vertical orientation. Also, as in the previously described embodiment, adjacent of the notches 162 in each of the belt rails 106 and adjacent of the vertically disposed belt rails 106 may be spaced at a distance less than the aforenoted center-to-center distance between the end fittings 115. Such spacing should, however, be at a distance that is equally divisible into the center-to-center distance between the end fittings 115.

Circular apertures 163 are formed in the belt rail leg 161 on either side of the notches 162. In the illustrated embodiment, the apertures 163 are formed equi-distant between the notches 162 for a reason which will become more apparent as this description proceeds. The distance between the apertures 163 is equal to the distance between the locking pins 126 and 127, 124 and 125 or between the locking pins 126 and 124 and 127 and 125. The diameter of the apertures 163 is complementary to the diameter of the locking pins 124 through 127. When the units 104 or 105 are supported upon the belt rails 106, the fixed end fitting member 128 will be received in a selected one of the notches 162 and certain of the locking pins 124 through 127 will be received in the apertures 163. The end fittings 115 are symmetric about a center line passing through the fixed member 128 to permit either vertical or horizontal orientation of the respective units 104 and 105. When disposed horizontally, the pins 125 and 127 or 124 and 126 will be received in the apertures 163, depending upon which side of the unit is uppermost. When disposed vertically, either the pins 126 and 127 or the pins 124 and 125 will be received in the apertures 163, depending upon which edge of the unit is uppermost.

As has been noted, the latching mechanism is automatically operated upon insertion or removal of the units 104 and 105 from their assembled relationship. Considering first unit 104, FIG. 8 illustrates this device in its attached position. If it is desired to remove the unit, a fork lift truck is brought into registry with the unit 104 with its forks extending through the respective apertures 141 in the freight engaging face 114. The forks are disposed in the openings 141 below the contact levers 137. As the forks are raised to lift the unit 104 from place, they will contact the underside of the levers 137 pivoting them in an upward direction and releasing the locking mechanism in the manner previously described. When the unit 104 is brought to its newly desired location, it is dropped in place with the fixed end fitting portions 128 entering the respective slots 162 of the belt rails 106. Continued downward movement of the forks of the fork lift truck will permit the contact levers 137 to pivot back to their engaged positions as the fork lift truck is removed thus causing automatic engagement of the locking mechanism.

Considering now removal of the horizontally disposed unit 105, the fork lift truck is brought into registry with the unit with its fork extending through the openings 139 defined by the members 140. As the forks are inserted, they will contact the lever 137 again pivoting it and causing the latching mechanism to be released. Engagement is accomplished in the aforenoted manner upon removal of the forks from the opening 139. It should also be readily apparent that the orientation contact lever 137 permits its movement to between the engaged and disengaged position regardless of which side of the lever is contacted. Thus, maximum versatility is attained.

The bracing units described have been referred to as pallets when positioned in their horizontal orientation. It should be readily apparent that the described units may also function as platforms, decks or other such horizontally extending surfaces. For this reason, when used throughout the specification hereof and in the claims the term "pallet" is intended to encompass any like horizontally extending surface.

While it will be apparent that the preferred embodiments of the invention disclosed are well calculated to fulfill the objects above stated, it will be appreciated that the invention is susceptible to modification, variation and change.

What is claimed is:

1. A combined pallet and bulkhead unit comprising frame means defining a load engaging face adapted to support cargo thereupon when positioned horizontally and adapted to engage a side of the cargo when positioned vertically to prevent shifting thereof, first and second spaced end fitting means at one side of said frame means for supporting said one side of said unit upon cooperating attachment means of a belt rail or the like, third and fourth spaced end fitting means at the other side of said frame means for supporting said other side of said unit upon cooperating attachment means of a belt rail or the like, the portion of each of said end fitting means adapted to cooperate with the belt rail attachment means being symmetric about a central axis for attachment of said end fitting means to the cooperating belt rail attachment means with said load engaging face extending either horizontally or vertically and without necessitating reorientation of said end fitting means relative to said frame means, and engagement means carried by said frame means and defining at least one pair of spaced openings for receiving the forks of a fork lift truck, each of said openings being sized and positioned to receive a respective of the forks regardless of whether said load engaging face is disposed horizontally or vertically, said openings being disposed to supportingly engage said bracing unit upon the forks when said bracing unit is in one of its positions and for continuing the support of the bracing unit upon the forks upon manipulation of said bracing unit into its other position, said openings being sized to facilitate the movement of said unit between its positions while supported upon the forks.

* * * * *